United States Patent
Roy et al.

(10) Patent No.: US 10,567,522 B2
(45) Date of Patent: Feb. 18, 2020

(54) WORKFLOW TO AUTOMATICALLY GENERATE REPORTS FOR DIFFERENT COMPONENT-LEVEL METADATA AFTER INTERACTING WITH MULTIPLE WEB SERVICES

(71) Applicant: Dell Products L.P., Round Rock, TX (US)

(72) Inventors: Mainak Roy, Kolkata (IN); Kavitha Kanagowder, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 305 days.

(21) Appl. No.: 14/588,598

(22) Filed: Jan. 2, 2015

(65) Prior Publication Data
US 2016/0198010 A1    Jul. 7, 2016

(51) Int. Cl.
*H04L 29/08* (2006.01)
*H04L 12/26* (2006.01)
*G06Q 30/02* (2012.01)

(52) U.S. Cl.
CPC ......... *H04L 67/22* (2013.01); *G06Q 30/0201* (2013.01); *H04L 43/045* (2013.01); *H04L 43/062* (2013.01)

(58) Field of Classification Search
CPC ....... H04L 67/22; H04L 43/04; H04L 43/045; H04L 43/062
USPC .................................................. 709/223–225
See application file for complete search history.

(56) References Cited

U.S. PATENT DOCUMENTS

| | | | |
|---|---|---|---|
| 8,190,992 B2* | 5/2012 | Tien | G06Q 30/00 715/243 |
| 8,261,181 B2* | 9/2012 | Tien | G06F 17/241 705/7.38 |
| 9,384,489 B2* | 7/2016 | Kennedy | |
| 9,569,721 B1* | 2/2017 | Lee | G06N 3/08 |
| 2004/0078424 A1* | 4/2004 | Yairi | H04L 51/04 709/203 |
| 2008/0163164 A1* | 7/2008 | Chowdhary | G06Q 10/06 717/106 |
| 2009/0083652 A1* | 3/2009 | Krasner | G06F 17/30557 715/772 |

(Continued)

OTHER PUBLICATIONS google.com, Analytics, https://www.google.com/analytics/standard/features/, printed Jan. 21, 2016.

(Continued)

*Primary Examiner* — Minh Chau Nguyen
(74) *Attorney, Agent, or Firm* — Terrile, Cannatti & Chambers; Stephen A. Terrile

(57) ABSTRACT

A system, method, and computer-readable medium are disclosed for automatically generating reports from component-level metadata collected from multiple web sources. A predetermined set of web sources are respectively monitored to detect user interactions with one or more predetermined components. Component-level metadata associated with such user interactions is then respectively collected from each web source and parsed to generate component-level metadata elements. The component-level metadata elements are then used to automatically generate reports on the user interactions with the predetermined components at multiple web sources.

18 Claims, 4 Drawing Sheets

(56) References Cited

U.S. PATENT DOCUMENTS

| | | | |
|---|---|---|---|
| 2011/0179110 A1* | 7/2011 | Soloway | G06F 17/30292 709/203 |
| 2011/0246900 A1* | 10/2011 | Hedges | G11B 27/034 715/738 |
| 2011/0276396 A1* | 11/2011 | Rathod | G06F 17/30867 705/14.49 |
| 2014/0052542 A1* | 2/2014 | Zhang | G06Q 30/0269 705/14.66 |
| 2014/0074716 A1* | 3/2014 | Ni | G06F 21/51 705/44 |
| 2014/0173444 A1* | 6/2014 | Wu | G06F 3/04842 715/734 |

OTHER PUBLICATIONS

Adobe, SiteCatalyst, http://tv.adobe.com/watch/learn-adobe-digital-marketing/what-is-sitecatalyst/, printed Jan. 21, 2016.
salesforce.com, Radian6 Demo, Marketing Cloud Social Studio Demo, https://www.salesforce.com/form/sem/crm-marketing-demo-social-studio.jsp?d=70130000, printed Jan. 21, 2016.
sdl.com, Customer Behavior Analytics Software Tools, http://www.sdl.com/cxc/customer-analytics/, printed Jan. 21, 2016.
Wikipedia, Mashup (web application hybrid), https://en.wikipedia.org/wiki/Mashup_(web_application_hybrid), printed Jan. 21, 2016.

\* cited by examiner

WORKFLOW TO AUTOMATICALLY GENERATE REPORTS FOR DIFFERENT COMPONENT-LEVEL METADATA AFTER INTERACTING WITH MULTIPLE WEB SERVICES

BACKGROUND OF THE INVENTION

Field of the Invention

The present invention relates to the management of information handling systems. More specifically, embodiments of the invention provide a system, method, and computer-readable medium for automatically generating reports from component-level metadata collected from multiple web sources.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

The widespread availability of such information handling systems has been instrumental in the adoption of social media into the mainstream of everyday life. Social media commonly refers to the use of web-based technologies for the creation and exchange of user-generated content for social interaction. An increasingly popular use of social media is to provide additional channels for customer support and user feedback. For example, it has now become common for organizations to post a wide variety of articles, white papers, blogs, and videos on social media environments and user forums in addition to other web sources, such as websites and user portals.

Various aspects of social media have likewise evolved into a viable and effective marketing channel for organizations to promote their brand, products and services. This new marketing channel, sometimes referred to as "social marketing," has proven effective in increasing customer retention rates, providing higher demand generation "lift," and increasing customer satisfaction and brand loyalty. Typical methods of measuring customer satisfaction in a social media environment include determining a Net Promoter Score (NPS), which provides a measure of customer satisfaction with the objective of creating more "Promoters" and fewer "Detractors." As such, NPS can provide a business performance metric by monitoring changes in customer satisfaction trends over time.

However, the distributed nature of social media environments and other web sources can create various issues. For example, an organization may have a need to track user interaction with numerous components, such as articles, white papers, blogs, and videos, which have been posted across multiple web sources. Known approaches to addressing this need include the use of various monitoring, listening and analytics capabilities. However many of these approaches are unable to provide a granular level of detail related to user interactions with individual components at a web source. Other approaches provide the ability to create customized mashups or dashboards that monitor and track user interactions with individual components, but only for a single web source. As a result, monitoring and tracking the number of views and downloads of each component, across multiple web sources, and then analyzing and correlating that information with associated products, topics, or issues can prove challenging.

SUMMARY OF THE INVENTION

A system, method, and computer-readable medium are disclosed for automatically generating reports from component-level metadata collected from multiple web sources. In various embodiments a predetermined set of web sources are respectively monitored by a web service implemented with an associated web source plugin to detect user interactions with one or more predetermined components. Component-level metadata associated with such user interactions is then respectively collected from each web source by the web services implemented with their associated web source plugins. The web services are then queried by their respective web source plugins to retrieve the component-level metadata that has been collected.

Once the collected component-level metadata is retrieved from each web service, it is provided to a component-level metadata collector and processing system, which stores it in a database of component-level metadata collected from multiple web sources. The component-level metadata is then parsed to generate component-level metadata elements, which is in turn stored in an associated table of component-level metadata elements. The component-level metadata elements are then used to automatically generate reports on the user interactions with the predetermined components at multiple web sources. In certain embodiments the reports may be customized to take into account various user requrements.

In various embodiments, the automatically generated report contains data related to various user interactions with components posted across multiple web sources. In these embodiments, the components may include articles, white papers, announcements, user postings, blogs, photographic images, graphical images, videos, executable code, binary files, text data, or database elements. Likewise the component-level metadata may include a file name or identifier, a page tab, an icon, a Uniform Resource Locator (URL), an object, or social media command buttons, any of which may be associated with a web source. In certain embodiments, the automatically generated report is displayed within a user interface (UI) window of a user device.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A system, method, and computer-readable medium are disclosed for automatically generating reports from component-level metadata collected from multiple web sources. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
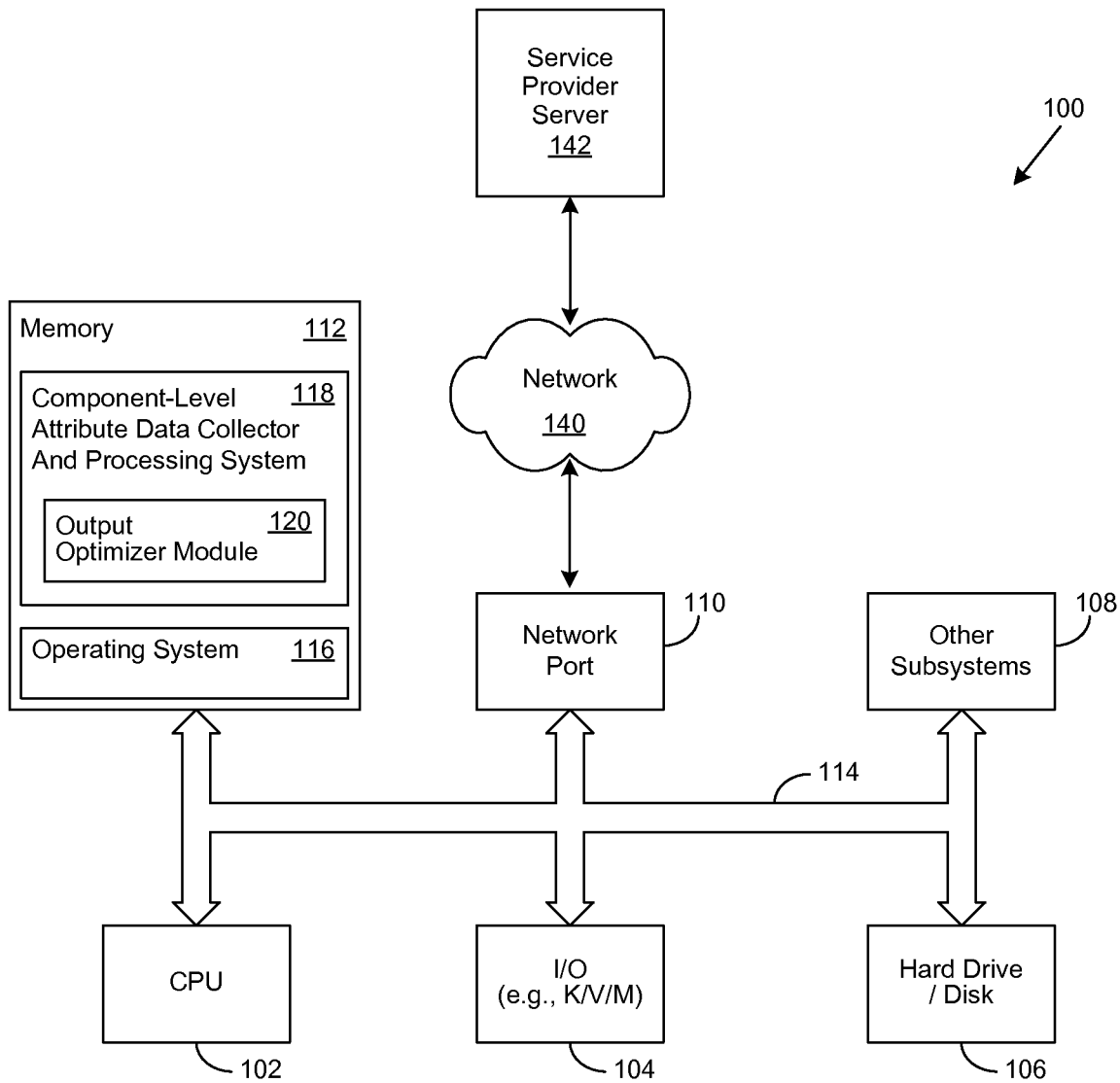
FIG. 1 is a general illustration of components of an information handling system as implemented in the system and method of the present invention.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further includes operating system (OS) 116 and in various embodiments may also include a component-level metadata collector and processing system 118. In certain embodiments, the component-level metadata collector and processing system 118 may include an output optimizer module 120. In one embodiment, the information handling system 100 is able to download the component-level metadata collector and processing system 118 from the service provider server 142. In another embodiment, the component-level metadata collector and processing system 118 is provided as a service from the service provider server 142.

Figure 2:
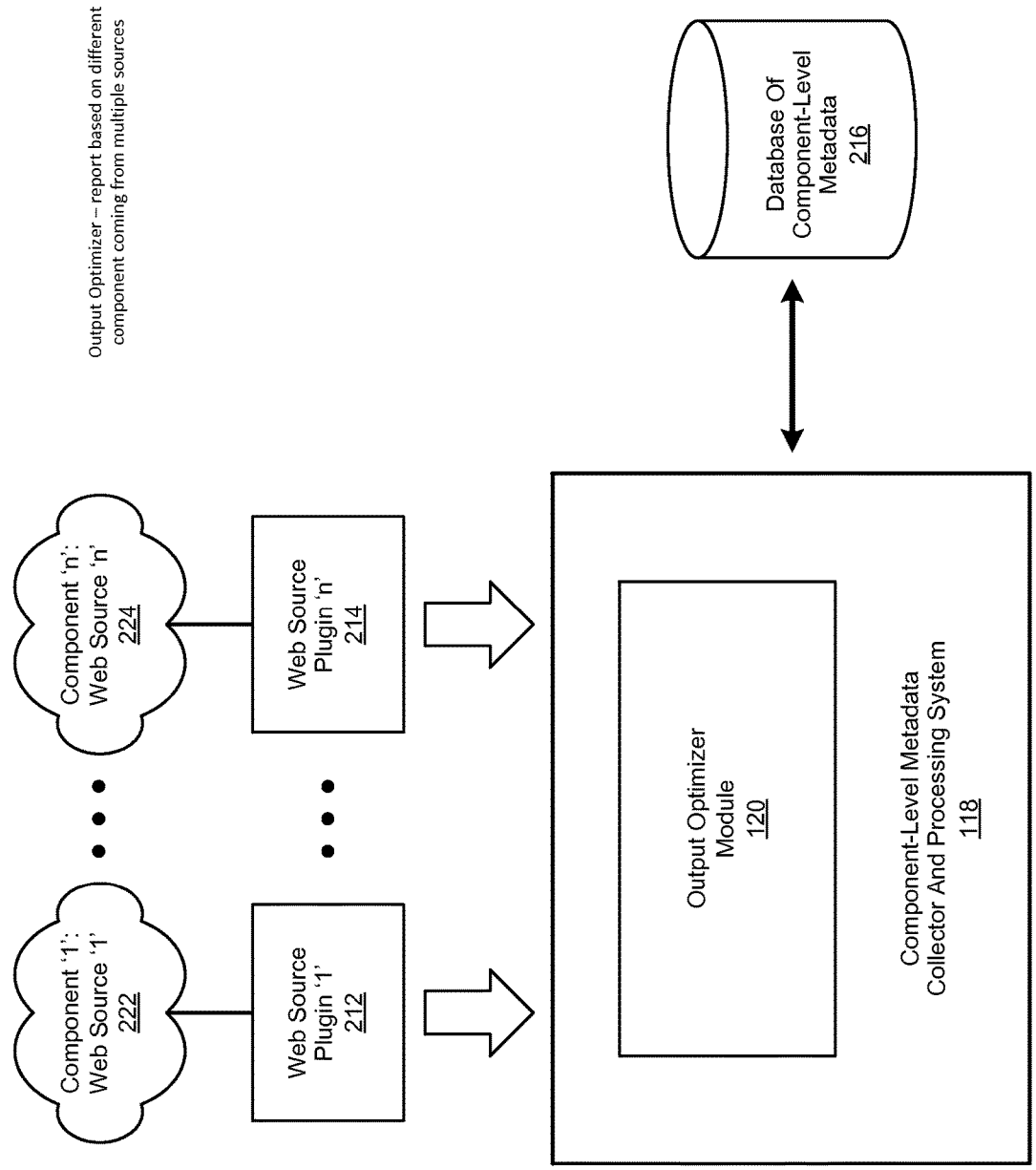
FIG. 2 is a simplified block diagram of a component-level metadata collector and processing system.

FIG. 2 is a simplified block diagram of a component-level metadata collector and processing system implemented in accordance with an embodiment of the invention. As used herein, a component broadly refers to a set of data, such as a data file, that is accessible for viewing or downloading from a web source. Examples of such components include articles, white papers, announcements, user postings, blogs, photographic images, graphical images, and videos. In various embodiments, a component may be executable code (e.g., an application or bug fix), a binary file (e.g., a bitmap or video file), text data (e.g., a document), or database elements (e.g., relational database data).

As likewise used herein, component-level metadata broadly refers to metadata associated with a component accessible from a web source. Examples of a component-level metadata include a file name or identifier, a page tab, an icon, a Uniform Resource Locator (URL), or an object associated with a web source. Additional examples of component-level metadata include social media command buttons familiar to those of skill in the art, such as a "like," "dislike," or "share" button. A web source, as used herein, broadly refers to a set of related web pages, such as a website, a user portal, a forum, or social media environment, which are accessible by a user to view, download or interact with a component. Skilled practitioners of the art will recognize that many such examples and embodiments are possible and the foregoing is not intended to limit the spirit, scope or intent of the invention.

In this embodiment, web sources '1' 222 through 'n' 224 are respectively monitored by a web service implemented with associated web source plugins '1' 212 through 'n' 214 to detect user interactions with one or more predetermined components. In various embodiments, a separate web source plugin '1' 212 through 'n' 214 is implemented for each web source '1' 222 through 'n' 224 that is monitored. The method by which individual web source plugins '1' 212 through 'n' 214, and their associated web services, are implemented is a matter of design choice.

Component-level metadata associated with such user interactions is then respectively collected by the web services implemented with web source plugins '1' 212 through 'n' 214. The web services are then queried by their respective web source plugins '1' 212 through 'n' 214 to retrieve the component-level metadata that has been collected. In various embodiments, the component-level metadata is retrieved in an Extensible Markup Language (XML) format familiar to those of skill in the art.

The component-level metadata collected from each web service is then provided to a component-level metadata collection and processing system 118, where it is stored in a database of component-level metadata 216 collected from multiple web sources. In various embodiments, the stored component-level metadata is then parsed, as described in greater detail herein, by the component-level metadata collection and processing system 118 to generate component-level metadata elements. The resulting component-level metadata elements are then stored in an associated table of component-level metadata elements in the database of component-level metadata 216. The method by which the component-level metadata is parsed, and then stored in a table of component-level metadata elements in the database of component-level metadata 216 is a matter of design choice. The component-level metadata elements are then used by an output optimizer module 120 implemented with the component-level metadata collection and processing system 118 to automatically generate reports on the user interactions with the predetermined components at multiple web sources.

Figure 3:
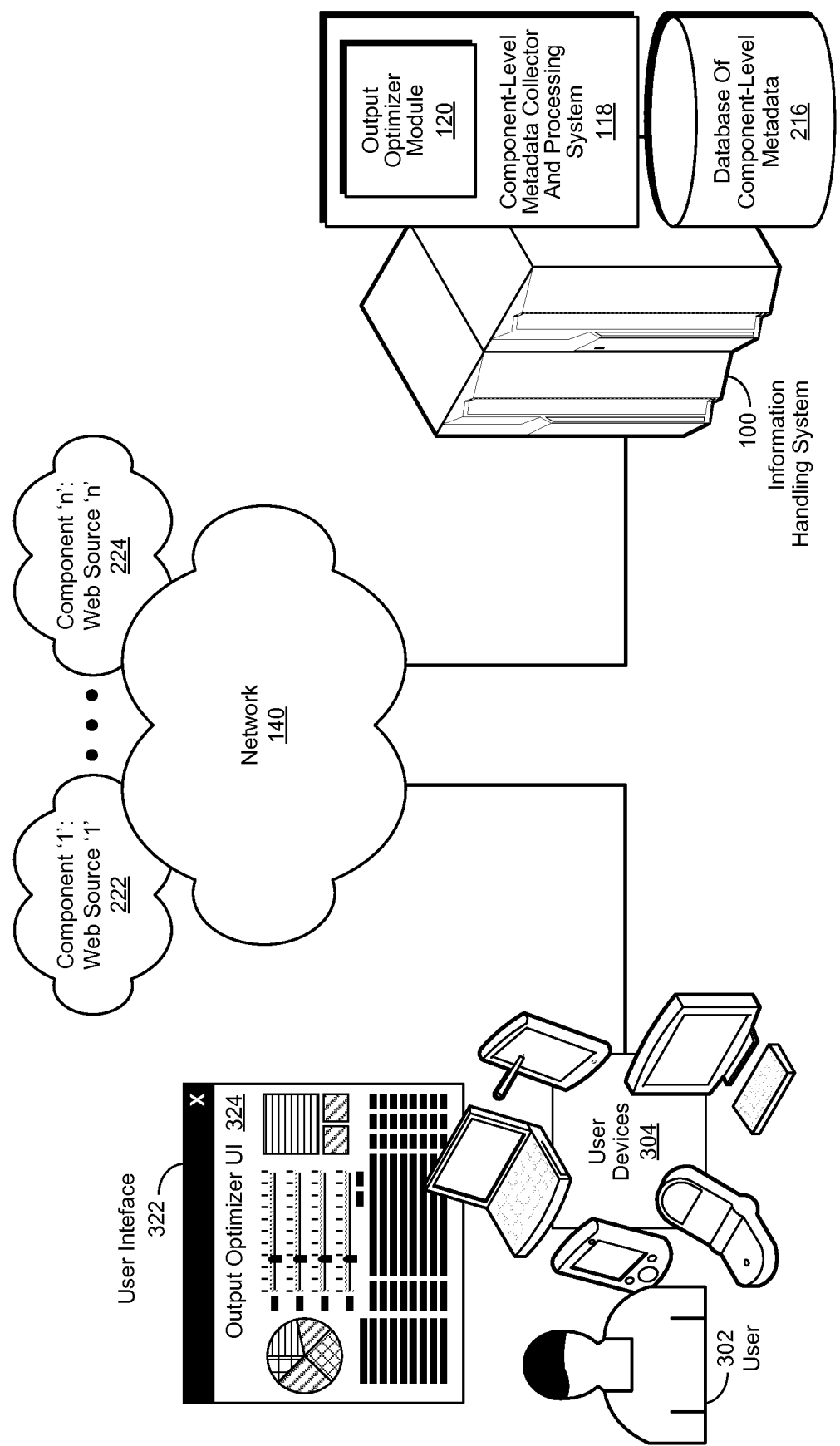
FIG. 3 is a simplified block diagram of a component-level metadata collector and processing system implemented to automatically generate reports from component-level metadata collected from multiple web sources.

FIG. 3 is a simplified block diagram of a component-level metadata collector and processing system implemented in accordance with an embodiment of the invention to automatically generate reports from component-level metadata collected from multiple web sources. In this embodiment, web sources '1' 222 through 'n' 224 are respectively monitored by a web service implemented with an associated web source plugin to detect user interactions with one or more predetermined components. Component-level metadata associated with such user interactions is then respectively collected from each web source '1' 222 through 'n' 224 by the web services implemented with their associated web source plugins. In various embodiments, a network 140 is used by the web services to collect the component-level metadata from each web source '1' 222 through 'n' 224. The web services are then queried by their respective web source plugins to retrieve the component-level metadata that has been collected.

Once the collected component-level metadata is retrieved from each web service, it is provided to the component-level metadata collector and processing system 118, described in greater detail herein. In various embodiments, the component-level metadata collector and processing system 118 is implemented on an information handling system 100. In certain embodiments, the information handling system 100 may include a database of component-level metadata 216, likewise described in greater detail herein. In various embodiments, the component-level metadata collector and processing system 118 may include an output optimizer module, which is used to automatically generate reports related to user interactions with various components posted to web sources '1' 222 through 'n' 224.

Once it is received by the component-level metadata collection and processing system 118, the component-level metadata is stored in a database of component-level metadata 216 collected from multiple web sources. In various embodiments, the stored component-level metadata is then parsed, as described in greater detail herein, by the component-level metadata collection and processing system 118 to generate component-level metadata elements. The resulting component-level metadata elements are then stored in an associated table of component-level metadata elements in the database of component-level metadata 216. The method by which the component-level metadata is parsed, and then stored in a table of component-level metadata elements in the database of component-level metadata 216 is a matter of design choice. The component-level metadata elements are then used by an output optimizer module 120 implemented with the component-level metadata collection and processing system 118 to automatically generate reports on the user interactions with the predetermined components at multiple web sources.

As an example, a web page at a web source may contain various components, including ten different videos, five different white papers, and seven different industry reports. To continue the example, other web pages at other web sources, such as web sources '1' 222 through 'n' 224, may contain some of the same components or possibly others. Being able to analyze user interaction with multiple components across multiple websites provides an organization with information that can assist in determining where to best invest their time, effort and resources.

In various embodiments, these automatically generated reports are displayed within a user interface (UI) window 324 of a UI associated with a user device 304. As used herein, a user device 304 refers to an information handling system such as a personal computer, a laptop computer, a tablet computer, a personal digital assistant (PDA), a smart phone, a mobile telephone, or other device that is capable of communicating and processing data. In certain embodiments, the user device 304 is used to receive an automatically generated report from the component-level metadata collection and processing system 118 through the use of a network 140. In certain embodiments, the network 140 may be a public network, such as the Internet, a physical private network, a wireless network, a virtual private network (VPN), or any combination thereof.

Skilled practitioners of the art will recognize that many such embodiments and examples are possible and the foregoing is not intended to limit the spirit, scope or intent of the invention.

Figure 4:
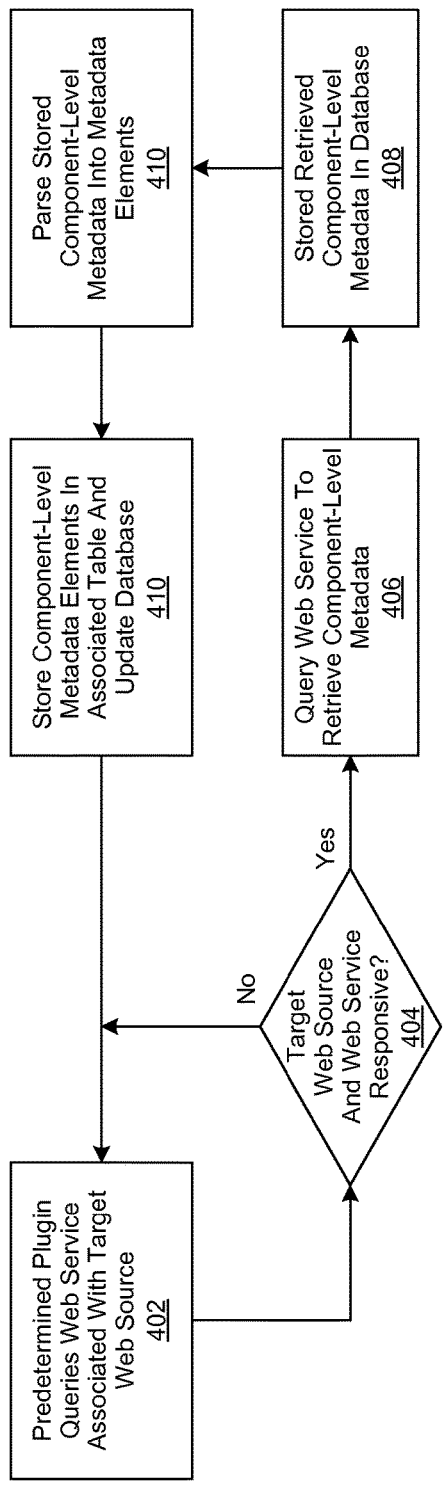
FIG. 4 is a generalized flowchart of the performance of component-level metadata collection and processing operations.

FIG. 4 is a generalized flowchart of the performance of component-level metadata collection and processing operations implemented in accordance with an embodiment of the invention. In this embodiment, a predetermined web source plugin queries a web service associated with a target web source in step 402, followed by a determination being made in step 404 whether the web service and its associated web source is responsive. If not, the process is continued, proceeding with step 402. Otherwise the web service is queried in step 406 to retrieve collected component-level metadata, described in greater detail herein. In various embodiments, the component-level metadata is retrieved in an Extensible Markup Language (XML) format familiar to those of skill in the art.

The component-level metadata collected from each web source is then stored in a database of component-level metadata collected from multiple web sources in step 408. In turn, the stored component-level metadata is then parsed in step 410 to generate component-level metadata elements. The resulting component-level metadata elements are then stored in an associated database table of a component-level database table in step 412 and the process is then continued, proceeding with step 402.

Figure 5:
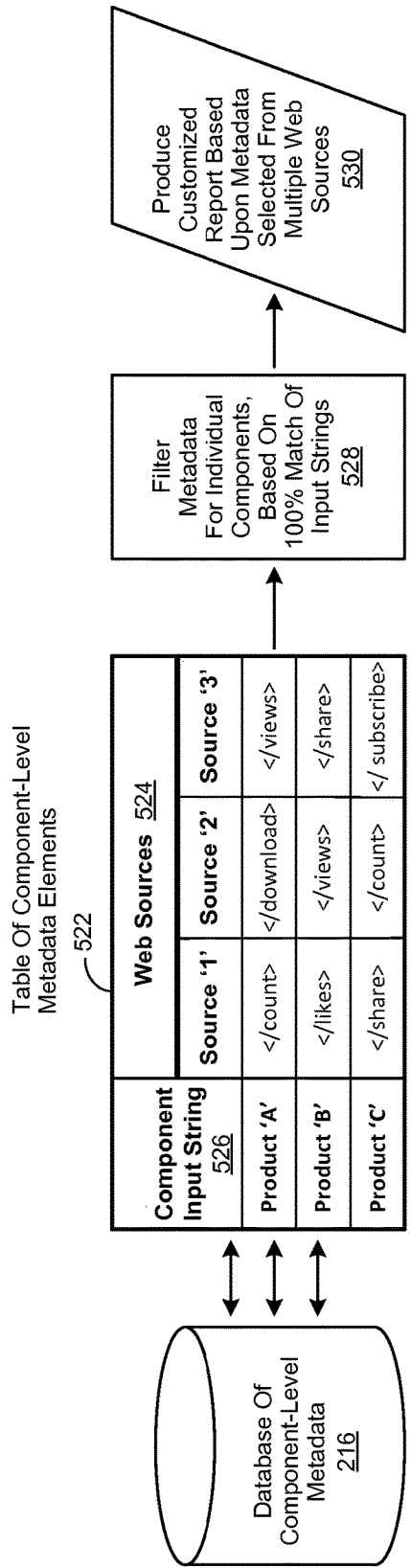
FIG. 5 is a simplified block diagram of the performance of component-level metadata processing operations to automatically generate a report.

FIG. 5 is a simplified block diagram of the performance of component-level metadata processing operations implemented in accordance with an embodiment of the invention to automatically generate a report. In various embodiments, and as described in greater detail herein, multiple web sources are respectively monitored by a web service implemented with an associated web source plugin to detect user interactions with one or more predetermined components. Component-level metadata associated with such user interactions, likewise described in greater detail herein, is then collected by the web services. The web services are then queried by their respective web source plugins to retrieve the component-level metadata that has been collected. In various embodiments, the component-level metadata is retrieved in an Extensible Markup Language (XML) format familiar to those of skill in the art.

In this embodiment, the component-level metadata collected from each web source is then stored in a database of component-level metadata 216 collected from multiple web sources. The stored component-level metadata is then parsed to generate component-level metadata elements which are then stored in an associated table 522 of component-level metadata elements in the database of component-level metadata 216. For example, as shown in FIG. 5, the associated table 522 of component-level metadata elements includes a web sources attribute 524, which identifies the web source (e.g., web sources '1', '2', and '3'), and a component input string attribute 526, which identifies the component (e.g., products 'A', 'B' and 'C'). As likewise shown in FIG. 5, the component-level metadata elements of </count>, </likes>, and </share> associated with web source '1' are likewise respectively associated with products 'A', 'B', and 'C'. The method by which the component-level method by which the component-level metadata is parsed, and then stored in the table 522 of component-level metadata elements is a matter of design choice.

In this and other embodiments, the component-level metadata stored in the table 522 of component-level metadata elements is processed in block 428 to filter out component-level metadata elements that do not match their associated component input string attribute 526. As an example, component-level metadata elements of </download>, </views>, and </count> may have been collected from web source '2' that are associated with products other than products 'A', 'B', and 'C'. In this example, the component-level metadata elements not associated with products 'A', 'B', and 'C' are filtered out. The parsed component-level metadata elements that are not filtered out are then used in block 530 to automatically generate a report on user interactions with the predetermined components at multiple web sources. The method by which the component-level metadata components are filtered, and the report is automatically generated is a matter of design choice.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

For example, the above-discussed embodiments include software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module.

Consequently, the invention is intended to be limited only by the spirit and scope of the appended claims, giving full cognizance to equivalents in all respects.

What is claimed is:

1. A computer-implementable method for automatically generating reports from component-level metadata collected from a plurality of web sources within a component-level metadata collector and processing environment, the component-level metadata collector and processing environment comprising a component-level metadata collector and processing system, the plurality of web sources, a database of component-level metadata and an output optimizer user interface, comprising:
   detecting a first set of user interactions with a first set of components at a first web source of the plurality of web sources and a second set of user interactions with a second set of components at a second web source of the plurality of web sources;
   receiving, via the component-level metadata collector and processing system, a first set of component-level metadata associated with the first set of user interactions and second set of component-level data associated with the second set of user interactions;
   storing the first and second sets of component-level data within the database of component-level metadata collected from a plurality of web sources;
   parsing, via the component-level metadata collector and processing system, the first and second sets of component-level metadata stored within the database of component-level metadata to generate component-level metadata elements, the component-level metadata elements being stored in an associated table of component-level metadata elements, the associated table of component-level metadata elements comprising a web sources attribute portion, the web sources attribute portion identifying a web source and a component input string attribute portion, the component input string attribute portion identifying a component, the component corresponding to a product;
   processing the component-level metadata to automatically generate a report via the component-level metadata collector and processing system, the component-level metadata collector and processing system executing on a hardware processor of the information handling system; and,
   displaying the report via the output optimizer user interface, the output optimizer user interface executing on a hardware processor of a user device.

2. The method of claim 1, wherein the automatically generated report comprises data related to the first and second sets of user interactions with the first and second sets of components at the first and second web sources.

3. The method of claim 2, wherein the automatically generated report comprises data related to a third set of user interactions with a subset of the first set of components and a fourth set of user interactions with a subset of the second set of components.

4. The method of claim 1, wherein each of the first and second sets of components comprises at least one member of the set of:
   an article;
   a white paper;
   an announcement;
   a user posting;
   a blog;
   a photographic image;
   a video file;
   an executable code;
   a binary file;
   a text data; and
   a database element.

5. The method of claim 1, wherein each of the first and second sets of component-level metadata comprises data related to the first and second sets of user interactions with at least one member of the set of:
 a file name;
 a file identifier;
 a page tab;
 an icon;
 a Uniform Resource Locator (URL);
 an object; and
 a social media command button.

6. The method of claim 1, wherein the automatically generated report is displayed within a user interface window of a user device.

7. A system comprising:
 a processor;
 a data bus coupled to the processor; and
 a non-transitory, computer-readable storage medium embodying computer program code, the non-transitory, computer-readable storage medium being coupled to the data bus, the computer program code interacting with a plurality of computer operations for automatically generating reports from component-level metadata collected from a plurality of web sources within a component-level metadata collector and processing environment, the component-level metadata collector and processing environment comprising a component-level metadata collector and processing system, the plurality of web sources, a database of component-level metadata and an output optimizer user interface, and comprising instructions executable by the processor and configured for:
  detecting a first set of user interactions with a first set of components at a first web source and a second set of user interactions with a second set of components at a second web source;
  receiving a first set of component-level metadata associated with the first set of user interactions and second set of component-level data associated with the second set of user interactions;
  storing the first and second sets of component-level data within a database of component-level metadata collected from a plurality of web sources;
  parsing the first and second sets of component-level metadata stored within the database of component-level metadata to generate component-level metadata elements, the component-level metadata elements being stored in an associated table of component-level metadata elements, the associated table of component-level metadata elements comprising a web sources attribute portion, the web sources attribute portion identifying a web source and a component input string attribute portion, the component input string attribute portion identifying a component, the component corresponding to a product; and
  processing the component-level metadata to automatically generate a report.

8. The system of claim 7, wherein the automatically generated report comprises data related to the first and second sets of user interactions with the first and second sets of components at the first and second web sources.

9. The system of claim 8, wherein the automatically generated report comprises data related to a third set of user interactions with a subset of the first set of components and a fourth set of user interactions with a subset of the second set of components.

10. The system of claim 7, wherein each of the first and second sets of components comprises at least one member of the set of:
 an article;
 a white paper;
 an announcement;
 a user posting;
 a blog;
 a photographic image;
 a video file;
 an executable code;
 a binary file;
 a text data; and
 a database element.

11. The system of claim 7, wherein each of the first and second sets of component-level metadata comprises data related to the first and second sets of user interactions with at least one member of the set of:
 a file name;
 a file identifier;
 a page tab;
 an icon;
 a Uniform Resource Locator URL);
 an object; and
 a social media command button.

12. The system of claim 7, wherein the automatically generated report is displayed within a user interface window of a user device.

13. A non-transitory, computer-readable storage medium embodying computer program code for automatically generating reports from component-level metadata collected from a plurality of web sources within a component-level metadata collector and processing environment, the component-level metadata collector and processing environment comprising a component-level metadata collector and processing system, the plurality of web sources, a database of component-level metadata and an output optimizer user interface, the computer program code comprising computer executable instructions configured for:
 detecting a first set of user interactions with a first set of components at a first web source and a second set of user interactions with a second set of components at a second web source;
 receiving a first set of component-level metadata associated with the first set of user interactions and second set of component-level data associated with the second set of user interactions;
 storing the first and second sets of component-level data within a database of component-level metadata collected from a plurality of web sources;
 parsing the first and second sets of component-level metadata stored within the database of component-level metadata to generate component-level metadata elements, the component-level metadata elements being stored in an associated table of component-level metadata elements, the associated table of component-level metadata elements comprising a web sources attribute portion, the web sources attribute portion identifying a web source and a component input string attribute portion, the component input string attribute portion identifying a component, the component corresponding to a product; and
 processing the component-level metadata to automatically generate a report.

14. The non-transitory, computer-readable storage medium of claim 13, wherein the automatically generated report comprises data related to the first and second sets of user interactions with the first and second sets of components at the first and second web sources.

15. The non-transitory, computer-readable storage medium of claim 14, wherein the automatically generated report comprises data related to a third set of user interactions with a subset of the first set of components and a fourth set of user interactions with a subset of the second set of components.

16. The non-transitory, computer-readable storage medium of claim 13, wherein each of the first and second sets of components comprises at least one member of the set of:
   an article;
   a white paper;
   an announcement;
   a user posting;
   a blog;
   a photographic image;
   a video file;
   an executable code;
   a binary file;
   a text data; and
   a database element.

17. The non-transitory, computer-readable storage medium of claim 13, wherein each of the first and second sets of component-level metadata comprises data related to the first and second sets of user interactions with at least one member of the set of:
   a file name;
   a file identifier;
   a page tab;
   an icon;
   a Uniform Resource Locator (URL);
   an object; and
   a social media command button.

18. The non-transitory, computer-readable storage medium of claim 13, wherein the automatically generated report is displayed within a user interface window of a user device.

* * * * *